Patented May 10, 1927.

1,627,977

UNITED STATES PATENT OFFICE.

MAX KRAFFT, OF HRUSCHAU, CZECHOSLOVAKIA.

PROCESS FOR THE PURIFICATION OF BURNER GASES AND FOR OBTAINING CHEMICALLY-PURE SULPHURIC ACID.

No Drawing. Application filed June 25, 1923, Serial No. 647,753, and in Germany June 30, 1922.

The present invention relates to a process which on the one hand enables the burner gases for sulphric acid manufacture to be purified to such a high degree, and in some cases with the production of valuable by-products, that they meet all the requirements of the contact process, and which on the other hand enables a chemically pure sulphuric acid to be directly produced from the $SO_3$-gases coming out of the contact furnace.

As is well known the the burner gases after they have been previously freed from dust by customary methods, still contain very fine particles of contaminating materials, chiefly in the form of cloud. It is also known that the cloud is only incompletely removed from a gas by washing with a liquid which is capable of dissolving the cloud-forming constituent itself, and that this purification takes place very much better and more easily if the liquid be allowed to boil under a reflux condenser. The vapour which rises from the liquid, since it is condensed in a cooled zone, surrounds the cloud particles as a liquid envelope, enlarges them and thereby enables them to be separated more easily from the gases. The reason for this is that while fine particles, the diameters of which are about equal to the wave-length of visible light, are difficult to separate from gas, small drops of a diameter of 0.01 m. m. and over are thrown down easily.

This fact, which is known per se, is made use of in an original manner, in accordance with the present invention, more particularly for the purpose of purifying the burner gases and for obtaining any valuable constituents contained in them, such as selenium, in concentrated form, by purposely incompletely carrying out the process and freeing the resulting gases from the greatly enlarged, but still non-separated, cloud particles in an adjoining electrical gas-purifying plant.

A feature of the process followed consists further in that the absorbing liquid is not kept boiling by the external application of heat, but that the heat of the burner gases is employed for this purpose.

The manner in which the process may be carried out will be understood from the following description.

The hot gases coming from the burners, after they have been freed to a great extent from dust, are conducted to a washing apparatus, which may suitably consist of a tower lined with acid resisting material. into which they enter from below and are drawn off from the top after the resultant cooling. The cooling is effected by means of a stream of liquid which passes through the tower in the opposite direction. The liquid which is fed to the top of the tower may suitably consist of diluted sulphuric acid; and, since it passes through the tower in the opposite direction to the current of gas, it becomes heated and concentrated, so that hot, concentrated sulphuric acid is delivered at the bottom of the tower. In the course of this process continuous vapourization takes place because the downwardly flowing liquid, as its temperature increases, gives off water vapour or water vapour and sulphuric acid vapour to the current of gas. These portions of water vapour and sulphuric acid vapour are carried upwards by the current of gas to the cooler zones of the tower, where they are again condensed to form drops of liquid. If the current of gas during this process is caused to flow sufficiently slowly through the tower and if, with the aid of external sources of heat, care is taken that, in spite of the slowness of the flow of gas, the vapourization process in the interior of the tower remains sufficiently vigorous then a practically pure gas can be drawn off from the top of the tower. This process, however, would be disadvantageous firstly for the reason that a considerable amount of extraneous heat must be consumed in order to maintain the high temperature at the foot of the tower and a vigorous vapourization inside the tower, and secondly because the impurities which are still present in the burner gases would collect as a thin mud in the liquid passing through the tower. If on the other hand, in order to avoid the necessity for the supply of external heat, the current of gas were only allowed to pass very slowly through the tower, then the entire advantage which lies in the enlargement of the particles would be lost because the vapourization and re-condensation of the absorbing liquid would shrink to an insignificant process of cloud formation and the action of the tower would essentially become merely a simple washing operation, which, as is well known, is a very incomplete and troublesome operation for the purification of burner gases.

This being the state of affairs, an original and surprising solution has now been found, namely to make the speed of the burner gases and the mass of them which passes through the tower in the unit of time greater than that which the process of vapourization and re-condensation of the washing liquid enables the particles of cloud to increase to the size of coarse, quickly growing drops, but at the same time sufficiently slow so that the particles by this process attain a size such that they are easily separable in an electrical gas-purifier. That is to say the particles are not converted into rain drops, which remain behind in the tower, but into a cloud of enlarged particles which can be easily thrown down and which are completely separated in the electrical gas-purifier by a single, quick passage through it. The advantage is thereby attained that the particles of cloud, in so far as they contain valuable constituents, such as selenium for example, are not deposited as a thin turbidity throughout the entire mass of the washing liquid passing through the tower, but these impurities are separated as rich condensation products in the electrical gas-purifier. The process of working up of these separated deposits to valuable industrial products is therefore greatly facilitated.

The foregoing process, therefore, differs from an ordinary washing process in that the cooling of the gases coincides with a vigorous vapourization and accompanying condensation of the liquid from the vapours formed.

By employing a similar process it is possible to obtain in the simplest manner a chemically pure sulphuric acid from the $SO_3$-gases coming from the contact furnace. To this end, the hot $SO_3$-gases are likewise conducted into a washing apparatus as hereinbefore described and their speed is again so regulated, that the $SO_3$ cloud particles attain a size such that they are easily separable in the electrical gas-purifier. The gases, after they have been treated in this manner, are conducted through an electrical gas-purifier of acid-resisting material, such as quartz, glass, porcelain or the like, so that the sulphuric acid separated in it cannot take up or become contaminated by impurities derived from the material of which the gas purifier is made. This sulphuric acid is then pure. A quantitative separation is effected, owing to the very favourable properties possessed by the particles after the above described preliminary treatment, by a single, quick passage through the electrical gas-purifier.

I claim:—

1. Process for the purification of burner gases and for obtaining chemically pure sulphuric acid which comprises freeing the burner gases from dust, passing the dust-free, hot gases through a washing apparatus and regulating the speed and the quantity of gases passing through the apparatus in such a manner that the particles of impurities in the form of cloud are enlarged by the vapourization and condensation of the washing liquid to such an extent that they are easily separable in an electrical gas-purifier but not to so great an extent that they are deposited in the washing apparatus and separating the enlarged particles in an electrical gas-purifier.

2. Process for the purification of burner gases and for obtaining chemically pure sulphuric acid which comprises freeing the burner gases from dust, passing the dust-free gases through a washing apparatus in which a washing liquid flows in the opposite direction to the gases and regulating the speed and the quantity of gases passing through the apparatus in such a manner that the particles of impurities in the form of cloud are enlarged by the vapourization and condensation of the washing liquid to such an extent that they are easily separable in an electrical gas-purifier but not to so great an extent that they are deposited in the washing apparatus, and separating the enlarged particles in an electrical gas-purifier.

3. Process for the purification of burner gases and for obtaining chemically pure sulphuric acid which comprises freeing the burner gases from dust, passing the dust-free, hot gases through a washing tower in which diluted sulphuric acid flows in the opposite direction to the gases and regulating the speed of the current of gases through the apparatus in such a manner that the particles of impurities in the form of cloud are enlarged by the vapourization and condensation of the sulphuric acid to such an extent that they are easily separable in an electrical gas-purifier but not to so great an extent that they are deposited in the washing tower, and separating the enlarged particles in an electrical gas-purifier.

4. Process for obtaining chemically pure sulphuric acid which comprises passing the $SO_3$-gases, after they have been freed from dust, through a washing apparatus and regulating their speed and the quantity of gases passing through the apparatus in such a manner so that the particles of impurities in the form of cloud are enlarged by the vapourization and condensation of the washing liquid to such an extent that they are easily separable but not to so great an extent that they are deposited in the washing apparatus, and separating the enlarged particles in a separate apparatus of acid resisting material.

5. Process as claimed in claim 1 in which the vapourization of the washing liquid is effected by means of the heat of the burner gases.

MAX KRAFFT.